US012049985B2

(12) United States Patent
Kondogiani et al.

(10) Patent No.: US 12,049,985 B2
(45) Date of Patent: Jul. 30, 2024

(54) PRESSURE VESSEL END FITTING RETENTION

(71) Applicant: Noble Gas Systems, Inc., Novi, MI (US)

(72) Inventors: Christopher T. Kondogiani, Novi, MI (US); Mallory Marie Barrett, Milford, MI (US)

(73) Assignee: Noble Gas Systems, Inc., Novi, MI (US)

( * ) Notice: Subject to any disclaimer, the term of this patent is extended or adjusted under 35 U.S.C. 154(b) by 192 days.

(21) Appl. No.: 17/762,500

(22) PCT Filed: Sep. 22, 2020

(86) PCT No.: PCT/US2020/051954
§ 371 (c)(1),
(2) Date: Mar. 22, 2022

(87) PCT Pub. No.: WO2021/061619
PCT Pub. Date: Apr. 1, 2021

(65) Prior Publication Data
US 2022/0356990 A1 Nov. 10, 2022

Related U.S. Application Data

(60) Provisional application No. 62/904,237, filed on Sep. 23, 2019.

(51) Int. Cl.
*F17C 1/00* (2006.01)

(52) U.S. Cl.
CPC ........ *F17C 1/005* (2013.01); *F17C 2209/227* (2013.01); *F17C 2223/036* (2013.01)

(58) Field of Classification Search
CPC ................ F17C 1/005; F17C 2209/227; F17C 2223/036; F17C 13/08; F17C 2201/0138;
(Continued)

(56) References Cited

U.S. PATENT DOCUMENTS

| | | | | |
|---|---|---|---|---|
| 1,929,511 | A | 10/1933 | Mulkey | |
| 10,563,821 | B2 * | 2/2020 | Aghilone | B60S 5/04 |

(Continued)

OTHER PUBLICATIONS

Internatoinal Search Report & Written Opinion of International Application No. PCT/US2020/051954 dated Dec. 24, 2020.

(Continued)

*Primary Examiner* — Shawn M Braden
(74) *Attorney, Agent, or Firm* — Young Basile Hanlon & MacFarlane, P.C.

(57) ABSTRACT

A pressure vessel assembly includes a pressure element storing compressed gas and a shell enclosing the pressure element and capture the compressed gas that permeates from the pressure element. The pressure vessel assembly includes an end fitting extending into a cavity of the pressure element and from the pressure element through the shell. The end fitting includes a stem that extends out from the shell in one direction and into the cavity of the pressure element in an opposite direction and a cap that surrounds the pressure element and the stem at a location external to the pressure element. The pressure vessel assembly includes a retention component sustaining engagement of the end fitting with at least one of the pressure element or the shell below a predetermined pressure threshold.

20 Claims, 16 Drawing Sheets

(58) Field of Classification Search
CPC ........ F17C 2201/056; F17C 2205/0111; F17C 2205/0323; F17C 2205/0382; F17C 2223/0123; F17C 1/00; F17C 2270/0168
See application file for complete search history.

(56) References Cited

U.S. PATENT DOCUMENTS

| | | | | |
|---|---|---|---|---|
| 2009/0159465 | A1* | 6/2009 | Mayer | F16K 17/04<br>137/542 |
| 2014/0305951 | A1 | 10/2014 | Griffith et al. | |
| 2016/0201851 | A1* | 7/2016 | Kim | F17C 5/007<br>220/581 |
| 2016/0363265 | A1 | 12/2016 | Griffith et al. | |
| 2017/0157837 | A1 | 6/2017 | Wexler et al. | |
| 2018/0111475 | A1 | 4/2018 | Wexler et al. | |
| 2018/0283610 | A1 | 10/2018 | Wexler et al. | |
| 2020/0278035 | A1* | 9/2020 | McEvoy | E21B 34/00 |
| 2021/0018106 | A1* | 1/2021 | Gretka, II | F16K 15/18 |

OTHER PUBLICATIONS

European Search Report for EP Application No. 20869921.5 dated Aug. 9, 2023.

* cited by examiner

PRESSURE VESSEL END FITTING RETENTION

CROSS-REFERENCE TO RELATED APPLICATIONS

This is a National Stage Entry of PCT International Application No. PCT/US2020/051954 filed on Sep. 22, 2020, published as WO2021/061619 on Apr. 1, 2021, which claims priority to U.S. Application No. 62/904,237, filed on Sep. 23, 2019, the entire disclosures of which are hereby incorporated by reference.

TECHNICAL FIELD

This application relates to pressure vessels with end fitting improvements to increase retention of pressurized gas.

BACKGROUND

Pressure vessels may be used to compress and store many different gaseous substances. The compressed gas is used in a variety of applications, such as vehicle fuel and industrial applications, and as such, the pressure vessels can be designed for safe transportation and refill capability. In order to achieve acceptable volumetric efficiency and aid in transport and storage, the gas should be compressed to store a great amount of mass in a small area to achieve a high density. To maintain a high density, the gas should be stored at a very high pressure.

Many pressure vessels that store and transport compressed gas include end fittings to connect the pressure vessel to a valve, adapter, coupling, or plug. End fittings are used to fill, empty, or seal the pressure vessel and can interface with a smaller cross-sectioned tube extending from a larger cross-sectioned body of the pressure vessel. The fitting is made of two parts, a stem that reaches inside of the tube and a cap that fits outside of the tube. At high pressures, stored, compressed gas within the pressure vessel can impose large forces on the end fitting, with the result of a potential disengagement of the end fitting. This disengagement or disconnection would restrict function of the pressure vessel, as leaks of the compressed gas would occur. Thus, precautions should be taken to ensure that end fittings are sufficiently fixed to the pressure vessel.

Many end fittings, for example, end fittings used with high pressure hydraulic and pneumatic hoses, include a barbed stem that is inserted into the hose and an outer shell that is crimped onto the hose. Increased retention force is achieved by adding barbs onto the stem of the end fitting and then crimping the outer shell onto the hose to surround the barbed stem. The barbs can also be used to create interference with the liner or inside of a tubular or pressure vessel. Once crimped, the barbs fit tightly against the corrugated tubing or body of the pressure vessel, and the separate parts are held together by a crimped cap. However, as certification standards typically use minimum design failure pressure to be two to three times higher than the working pressure, this technique may not be sufficient to retain end fittings in higher pressure systems.

SUMMARY

The disclosure relates to a pressure vessel assembly including a pressure element storing compressed gas and a shell enclosing the pressure element and capture the compressed gas that permeates from the pressure element. The pressure vessel assembly including an end fitting extending into a cavity of the pressure element and from the pressure element through the shell. The end fitting including a stem that extends out from the shell in one direction and into the cavity of the pressure element in an opposite direction and a cap that surrounds the pressure element and the stem at a location external to the pressure element. The pressure vessel assembly including a retention component sustaining engagement of the end fitting with at least one of the pressure element or the shell below a predetermined pressure threshold.

The stem may include one or more barbs that lock the stem in a fixed position in relation to the pressure element. The stem may further include holes extending through a surface of the stem, venting the compressed gas as the stem moves out of the cavity, and reducing pressure on the end fitting. The retention component may be an anchor positioned proximate to an end of the stem and positioned at a location within the cavity of the pressure element, and the anchor may include one or more arms for preventing removal of the stem from the cavity of the pressure element below the predetermined pressure threshold. The one or more arms of the anchor may include an edge that is flat, blunt, sharp, or any combination thereof, and the edge may puncture the pressure element above the predetermined pressure threshold. The stem may further include holes extending through the stem and venting the compressed gas to a pressure level below the predetermined pressure threshold as the stem moves out of the cavity and before the edge of the one or more arms punctures the pressure element. The stem may further include a first ridge positioned between the end of the stem and the anchor, and the first ridge fails and allows movement of the anchor as the anchor contacts the first ridge. The stem may further include a second ridge spaced from the first ridge, and the second ridge may be closer to the end of the stem than the first ridge, the second ridge configured to stop movement of the anchor as the anchor contacts the second ridge.

The retention component may be an adhesive plug, and the adhesive plug and the stem may be directly couple at a fixed position within the cavity of the pressure element and to prevent end fitting disengagement below the predetermined pressure threshold. The cap may be a first cap, and the retention component may include a bulkhead assembly including a second cap surrounding the pressure element and the stem at a location internal to and abutting an interior surface of the shell. The bulkhead assembly may include a third cap surrounding the stem at a location external to and abutting an exterior surface of the shell and a first collar coupling to the second cap. The first collar may distribute pressure applied to the second cap to the shell. The bulkhead assembly may include a second collar coupling to the third cap, and the second collar may clamp the shell between the second collar and the first collar. The bulkhead assembly may include one or more screws tightening or loosening the first and second collars in respect to the shell or in respect to the second or third caps. The retention component may include a tether with a first end coupled to the stem at a location external to the shell and a second end coupled to a curved portion of another pressure element interior to the shell.

The disclosure further relates to a pressure vessel assembly including a pressure element defining a cavity with a wide portion and a narrow portion, and the pressure element stores compressed gas. The pressure vessel assembly may include an end fitting extending into the cavity of the pressure element, and the end fitting may include a stem extending through the narrow portion and the wide portion and a cap surrounding the narrow portion of the pressure element and the stem at a location external to the pressure element.

The stem may include one or more barbs that lock the stem in a fixed position in relation to the pressure element. The narrow portion may include corrugations that align with the one or more barbs, and the cap may be crimp-able around the narrow portion so that the cap conforms to the corrugations, the one or more barbs, or both. The cap may include indents positioned to align with the corrugations and the one or more barbs, and the cap may be crimp-able around the narrow portion and the stem so that a tight fit forms between the corrugations, the one or more barbs, and the indents. When the cap crimps around the stem and the narrow portion at the corrugations, the cap may stretch axially so that the tight fit is formed between the pressure element and the stem.

The disclosure further relates to a pressure vessel assembly including pressure elements for storing compressed gas and a shell enclosing the pressure elements. The shell captures the compressed gas that permeates from the pressure elements. The pressure vessel assembly includes an end fitting extending through the shell and into a cavity of the pressure elements, and the end fitting includes a stem having a first end and a second end. The first end extends into the cavity of the pressure elements, and the second end extends out through the shell. The stem has a hollow portion so that the compressed gas is passable through the stem. The end fitting includes a tube fixed to the first end of the stem that distributes adhesive supplied through the hollow portion of the stem, and the distributed adhesive retains the end fitting within the pressure elements.

The pressure vessel assembly may further include an adhesive plug formed by the distributed adhesive, positioned between the stem and the pressure elements, and used to retain the end fitting within the pressure elements. The stem may further include barbs locking the stem in a fixed axial position in relation to the pressure elements so that the adhesive plug forms below a distal end of the tube. The cavity of the pressure elements may include a narrow portion and a wide portion, and the wide portion may house the tube and the adhesive plug. The narrow portion may include corrugations aligned along the barbs of the stem, and the corrugations may interface with the barbs of the stem so that the stem holds in a fixed axial position. The pressure vessel assembly may further include a cap crimp-able around the narrow portion of the pressure elements so that the second end of the stem is secured by the cap, and the cap and the adhesive plug may prevent the end fitting from moving radially relative to the pressure elements.

DETAILED DESCRIPTION

Figure 1:
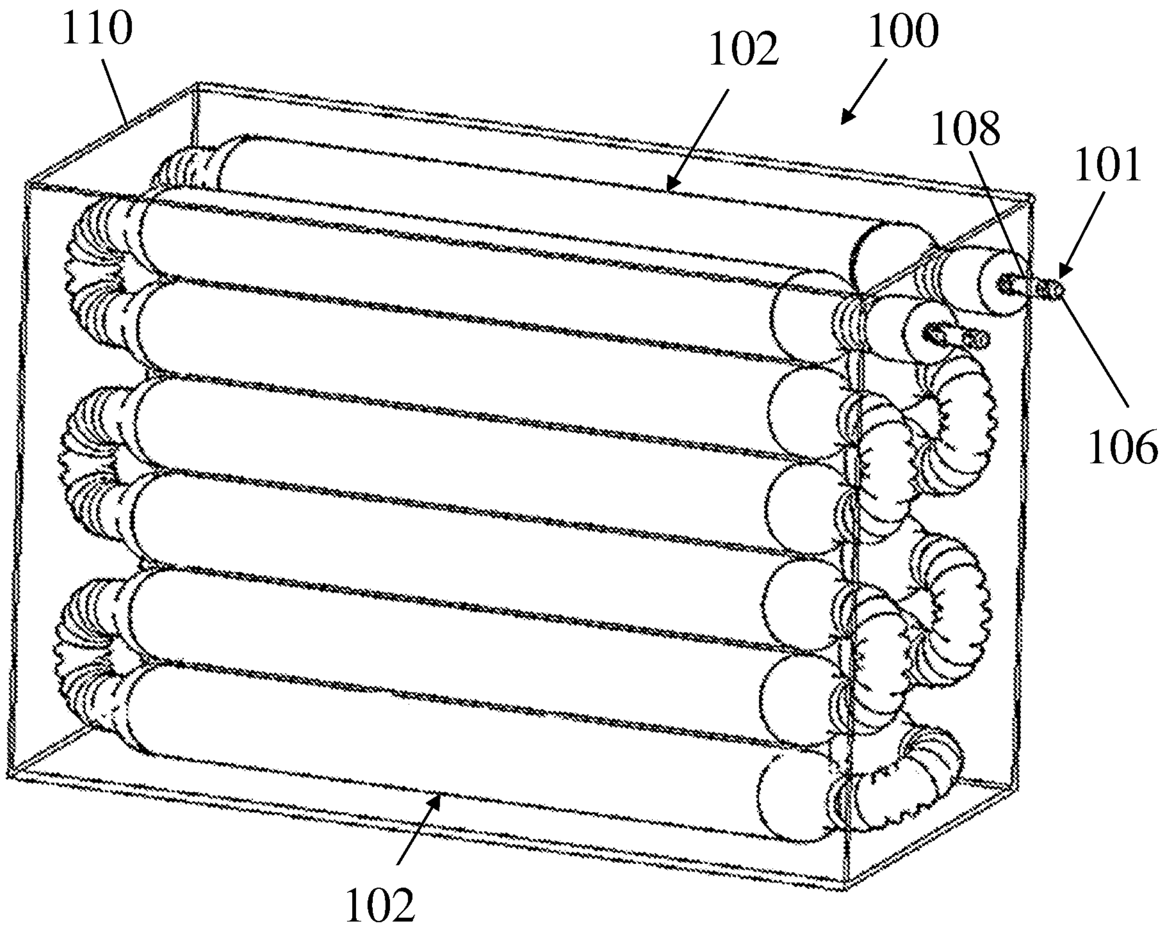
FIG. 1 is a perspective view of a pressure vessel assembly.

The end fitting retention features disclosed herein are designed to increase retention capacity beyond what is provided by barbs alone. Several techniques of increasing retention capacity of the end fittings to pressure vessels are disclosed. One technique includes drilling small holes into sides of a stem portion of the end fitting. If the end fitting including the holes in the stem begins to disengage from the pressure vessel, gas will be released through the holes to decrease the pressure below the maximum retention capacity of the end fitting, slowing and/or stopping disengagement of the end fitting from the pressure element.

Another technique of retaining end fittings to pressure elements includes adding an anchor assembly to the end fitting. Once the end fitting is pushed through smaller-diameter tubing into the wide portion of the pressure element, the anchor assembly is seated into the wide portion of the pressure element and arms of the anchor assembly spread open. When deployed or opened, the arms of the anchor assembly are extended such that the end fitting is too wide to be pulled back out of the smaller-diameter tubing. Additionally, edges on the arms of the anchor assembly that engage with the inner cavity of the pressure element (e.g., the interior of the wide portion) can be tuned to pierce the cavity of the pressure element at specific pressure thresholds. For example, the anchor can be designed to pierce or puncture the cavity when a pressure level within the pressure element is some predetermined percentage (e.g. 50%, 100%, etc.) above a certification requirement, but still below a disengagement threshold. The edges may be flat, sharp, or blunt. Puncture of the cavity of the pressure vessel will provide pressure relief at the specific pressure threshold as designed, changing the failure mode from total end fitting disengagement to a slow leaking of gas through the pierced cavity and wall of the pressure element.

Another technique of retaining end fittings to pressure vessels is to use an adhesive, or another viscous or liquid substance, that cools or hardens between the cavity and tube of the stem of the end fitting to form an assembly with the stem of the end fitting fixed inside the tube or cavity of the pressure vessel using the cooled or hardened adhesive. The adhered parts provide a wide, solid base that is sized such that the adhered parts cannot be pushed out through the narrow portion of the tube of the pressure element. The wide portion of the pressure element will also help to distribute the stress acting on the end fitting and wide portion of the pressure element from the compressed gas.

Another technique of retaining end fittings to pressure vessel is to use a bulkhead assembly to secure the end fitting to a container or shell that surrounds the pressure elements. The use of the bulkhead assembly allows the container or shell to be a sturdy foundation to which the end fitting can be attached. The bulkhead assembly may include one or more collars and one or more nuts that either tighten or loosen the seal around the end fitting. A tether may also be included between a pressure vessel inside the container or shell and the end fitting outside of the container or shell to help keep the end fitting in place with respect to the container or shell.

The retention methods and techniques described herein can be used independently or together in order to improve end fitting retention for high-pressure, compressed-gas pressure vessels.

FIG. 1 is a perspective view of a pressure vessel assembly 100. The pressure vessel assembly 100 includes end fittings 101 and pressure elements 102. Each end fitting 101 includes a cap 106 and a stem 108. The pressure vessel assembly 100 includes a shell 110 that is designed to capture gas that permeates from the pressure elements 102 and to protect the pressure elements 102. On one of the pressure elements 102 that extend through the shell 110, the end fittings 101 are shown. The end fittings 101 are designed to contain the pressurized gas within the pressure vessel assembly 100. The end fittings 101 may also serve as connectors to valves, adaptors, couplings, or other interfaces to the pressure elements 102 within the pressure vessel assembly 100 for use in filling or emptying the pressure elements 102.

Figure 2:
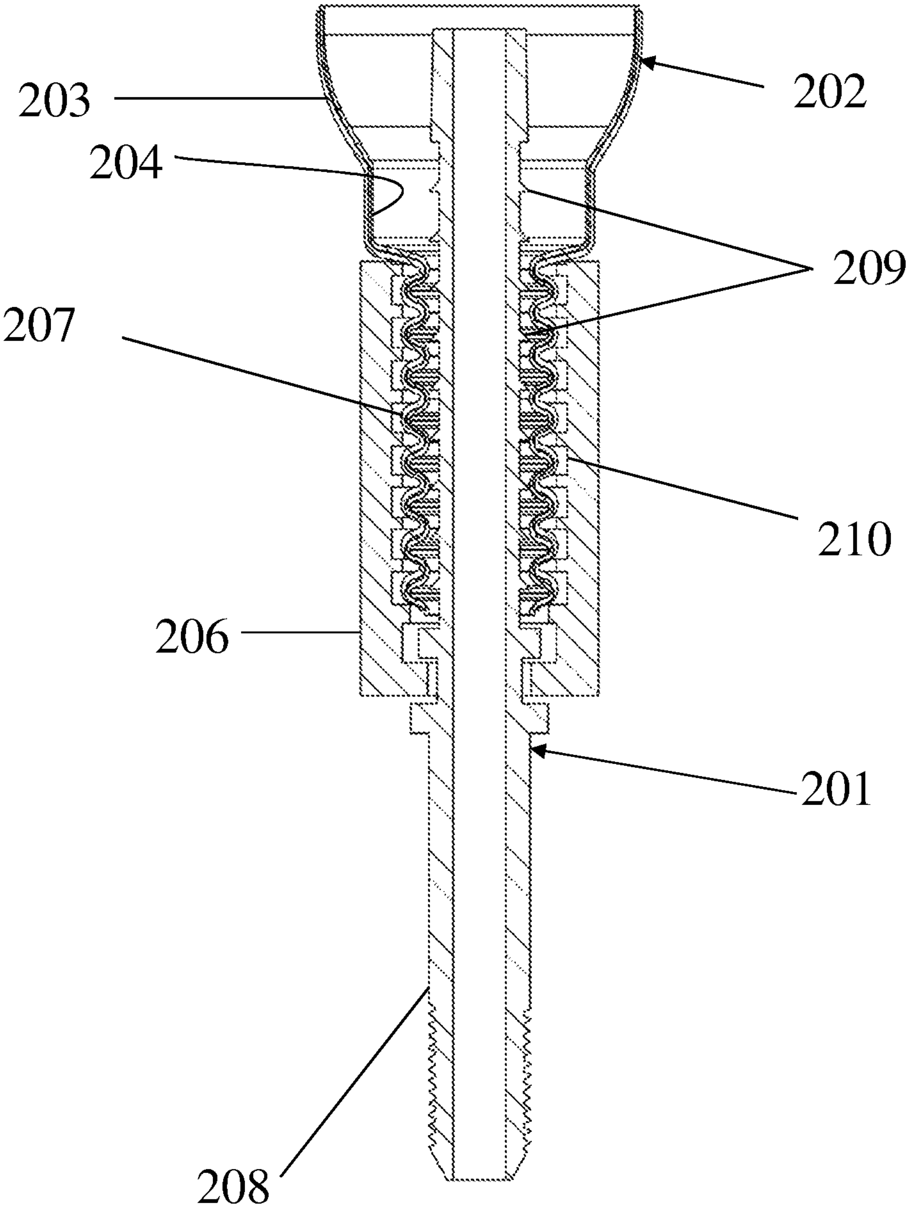
FIG. 2 is a partial cross-sectional view of an end fitting and a pressure element for use with the pressure vessel assembly of FIG. 1.

FIG. 2 is a partial cross-sectional view of an end fitting 201 and a pressure element 202 for use with the pressure vessel assembly 100 of FIG. 1. The pressure element 202 is surrounded by a reinforcement fiber 203. The end fitting 201 connects with the pressure element 202 both through a cavity 204 defined within the pressure element 202 and with the reinforcement fiber 203 that surrounds the pressure element 202. In other words, the pressure element 202 includes the cavity 204 and is covered by the reinforcement fiber 203. The end fitting 201 includes a cap 206 and a stem 208. Corrugation on a narrow portion 207 of the pressure element 202 is aligned with raised barbs 209 on the stem 208 and indents 210 on the cap 206. Thus, when the cap 206 is crimped around the stem 208 and the narrow portion 207 of the pressure element 202 at the location of the corrugation of the narrow portion 207, the cap 206 stretches axially, resulting in a tight fit between the pressure element 202, the cap 206, and the stem 208. Crimping together the pressure element 202, the cap 206 that is overlapping the narrow portion 207 of the pressure element 202, and the stem 208 that is inserted into the cavity 204 of the pressure element 202 causes interference and friction between the pressure element 202, the cap 206, and the stem 208. This crimped interface helps to hold the end fitting 201 in place both on an exterior of and within the cavity 204 of the pressure element 202. However, this technique of retaining the end fitting 201 may be insufficient for some high-pressure applications.

Figure 3:
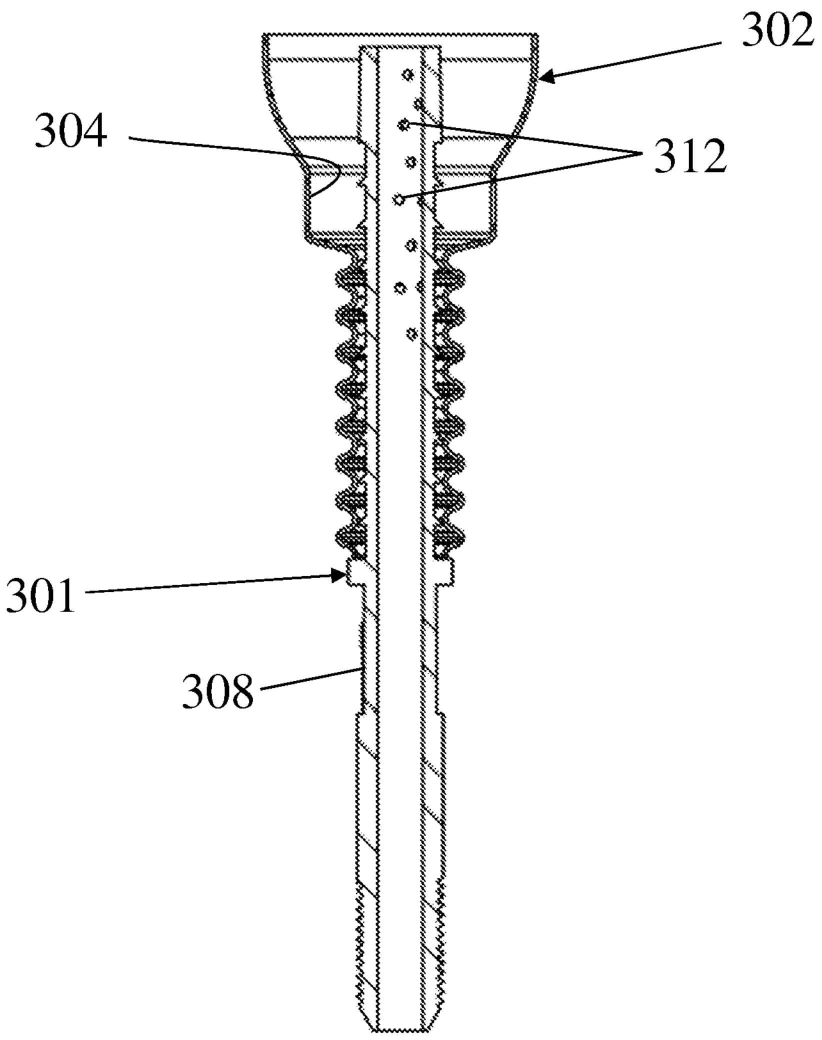
FIG. 3 is a partial cross-sectional view of another end fitting and another pressure element for use with the pressure vessel assembly of FIG. 1.

FIG. 3 is a partial cross-sectional view of another end fitting 301 and another pressure element 302 for use with the pressure vessel assembly 100 of FIG. 1. The end fitting 301 enters a cavity 304 of the pressure element 302. The end fitting 301 includes a stem 308 with holes 312 disposed on the stem 308 along a portion of the stem 308 that reaches inside the cavity 304 of the pressure element 302. The holes 312 are also disposed along a portion of the pressure element 302 that is crimped in a manner described in reference to FIG. 2.

In the FIG. 3 example, if the end fitting 301 begins to disengage from the pressure element 302, the stem 308 begins to move out of the cavity 304. The holes 312 in the stem 308 will vent some of the pressurized gas that is forcing the stem 308 out of the cavity 304. As the gas vents through the holes 312 of the stem 308, there is less pressure exerted on the end fitting 301. This reduction in pressure directly decreases the amount of force that the pressurized gas exerts onto the end fitting 301. By reducing the pressure within the pressure element 302 below a predetermined pressure threshold, disengagement the end fitting 301 is either slowed or stopped, depending on the level of pressure reduction. For example, if the pressure element 302 is designed to store gas at 10,000 psi, the end fitting 301 may begin to disengage from the pressure element 302 if stored gas reaches a level of 25,000 psi, at which point, the holes 312 in the stem 308 will vent gas slowly, and pressure levels in the pressure element 302 will decrease, slowing or avoiding disengagement of the end fitting 301.

Figure 4:
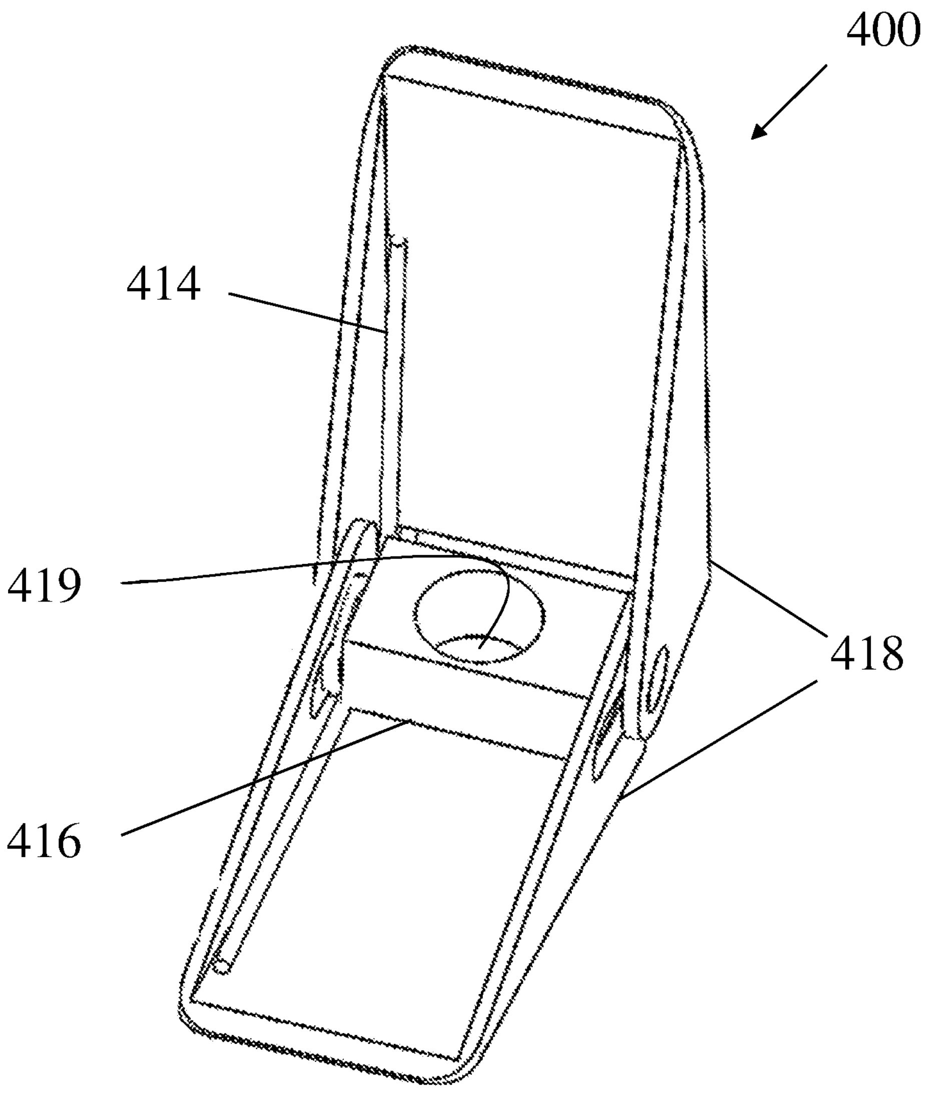
FIG. 4 is a perspective view of an anchor for use with a pressure element such as the pressure elements of FIGS. 1-3 in the pressure vessel assembly of FIG. 1.

FIG. 4 is a perspective view of an anchor 400 for use with a pressure element such as the pressure elements 102, 202, 302 of FIGS. 1-3 in the pressure vessel assembly 100 of FIG. 1. The anchor 400 is used in another technique of retaining an end fitting such as the end fittings 101, 201, or 301 of FIGS. 1-3. The anchor 400 includes a torsion spring 414, a connector piece 416, arms 418, and a hole 419. The anchor 400 is designed for attachment to a stem such as the stems 108, 208, 308 of FIGS. 1-3 via the hole 419, which can be threaded or otherwise configured for retention to the stem. The two arms 418 of the anchor 400 are held together by the torsion spring 414. The torsion spring 414 can be formed with a relatively high spring constant to exert force against the arms 418. The arms 418 of the anchor 400 can have flat edges that are rounded at the corners as shown in FIG. 4. The edges of the arms 418 may also be designed to puncture a reinforcement fiber of a pressure element such as the pressure elements 102, 202, 302 of FIGS. 1-3 at a pressure level or threshold that is below a disengagement pressure threshold for an end fitting such as the end fittings 101, 201, 301 of FIGS. 1-3. The arms 418 may thus enable a slower leak failure mode to be selected over an end fitting disengagement failure mode.

Figure 5:
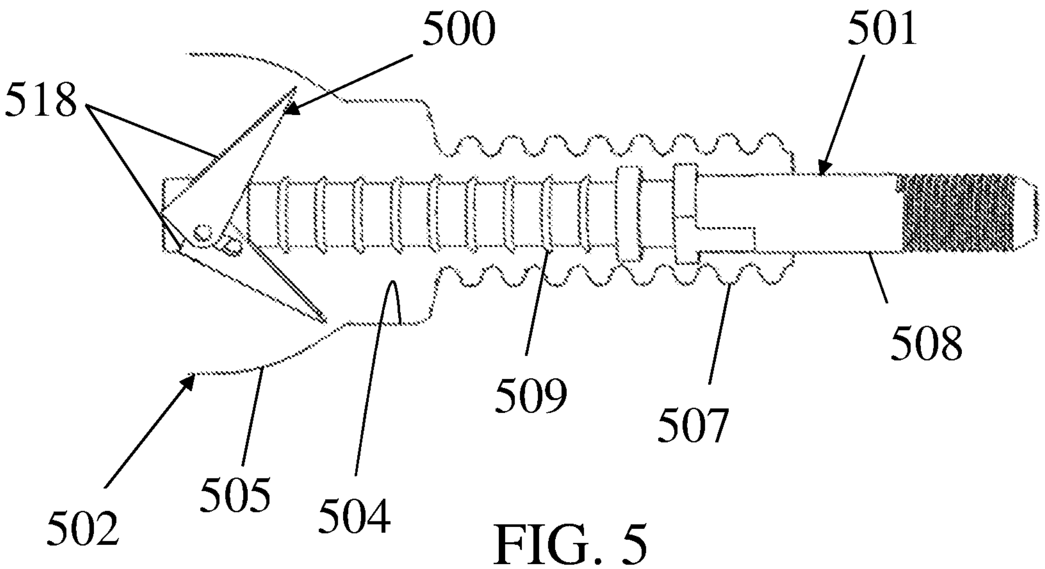
FIG. 5 is a cutaway, partial side view of an anchor engaged with an end fitting for use with a pressure element that can be used in the pressure vessel assembly of FIG. 1.

FIG. 5 is a cutaway, partial side view of an anchor 500 engaged with an end fitting 501 for use with a pressure element 502 that can be used in the pressure vessel assembly 100 of FIG. 1. The anchor 500 is similar to the anchor 400 of FIG. 4. The pressure element 502 includes a cavity 504 within a wider portion 505 and a narrow portion 507. The end fitting 501 includes a stem 508 with threads 509 on the stem 508 that connect with the anchor 500 so that the anchor 500 is fixed atop the stem 508 and cannot move along the longitudinal axis of the stem 508. To improve retention of the end fitting 501, the stem 508 and anchor 500 are threaded into a cavity 504 of the pressure element 502. The anchor 500 is fixed on the end of the stem 508 so that the anchor 500 cannot slide along the longitudinal axis of the stem 508 during insertion of the stem 508 or after the stem 508 is inserted into the cavity 504. Arms 518 of the anchor 500 open up away from the narrow portion 507 of the pressure element 502 so that the arms 518 can close upon insertion of the anchor 500 and the stem 508 into the cavity 504 at the narrow portion 507 of the pressure element 502. The arms 518 of the anchor 500 will expand to engage the pressure element 502 within the cavity 504 at the wide portion 505 of the pressure element 502. The end fitting 501 and the pressure element 502 are then crimped together at the narrow portion 507 of the pressure element 502 to connect with the stem 508. As the compressed gas within the pressure element 502 creates a force on the stem 508 axially outward from the pressure element 502, the anchor 500 will create an opposite force at a location where the arms 518 interface with the pressure element 502 to keep the stem 508 in a fixed position.

When the stem 508 and the anchor 500 are coupled together, the stem 508 and the anchor 500 can be inserted into the cavity 504 of the pressure element 502, and the arms 518 get pushed together by the narrow portion 507 of the pressure element 502 so that the arms 518 are generally parallel with the stem 508. Once the anchor 500 reaches the wide portion 505 of the pressure element 502, the spring of the anchor 500 pushes the arms 518 open to a predetermined angle based on the design of the spring. The angle may be about 30 degrees or more, about 35 degrees or more, about 40 degrees or more, or about 45 degrees or more. The angle may be about 70 degrees or less, about 65 degrees or less, about 60 degrees or less, about 55 degrees or less, or about 50 degrees or less. The anchor 500 is designed to open with a total angle measured between the arms 518 that is wider than the narrow portion 507 of the pressure element 502 so that the arms 518 prevent removal of the stem 508 from the cavity 504 of the pressure element 502. Thus, the anchor 500 may change the failure mode from end fitting disengagement to slow leaking. This change in failure mode occurs because the anchor 500 punctures the pressure element 502 when the tensile force on the pressure element 502 reaches a predetermined pressure threshold. Therefore, at the pressure threshold of failure, the pressure element 502 leaks instead of the end fitting 501 disengaging from the pressure element 502.

In some embodiments, designing the anchor 500 so that leaking of the pressure element 502 occurs above a predetermined pressure threshold to relieve pressure is optional in terms of the use of the anchor 500. The anchor 500 can be designed so that the arms 518 fail through deformation of the spring or bodies of the arms 518 rather than causing a puncture or breaking apart of the anchor 500. When the arms 518 are designed to bend instead of break, the arms 518 still cannot fit through the narrow portion 507 of the pressure element 502, so slow leaking occurs in contrast to a broken anchor 500 which could slip out of the narrow portion 507 and allow a disengagement failure mode.

Figure 6:
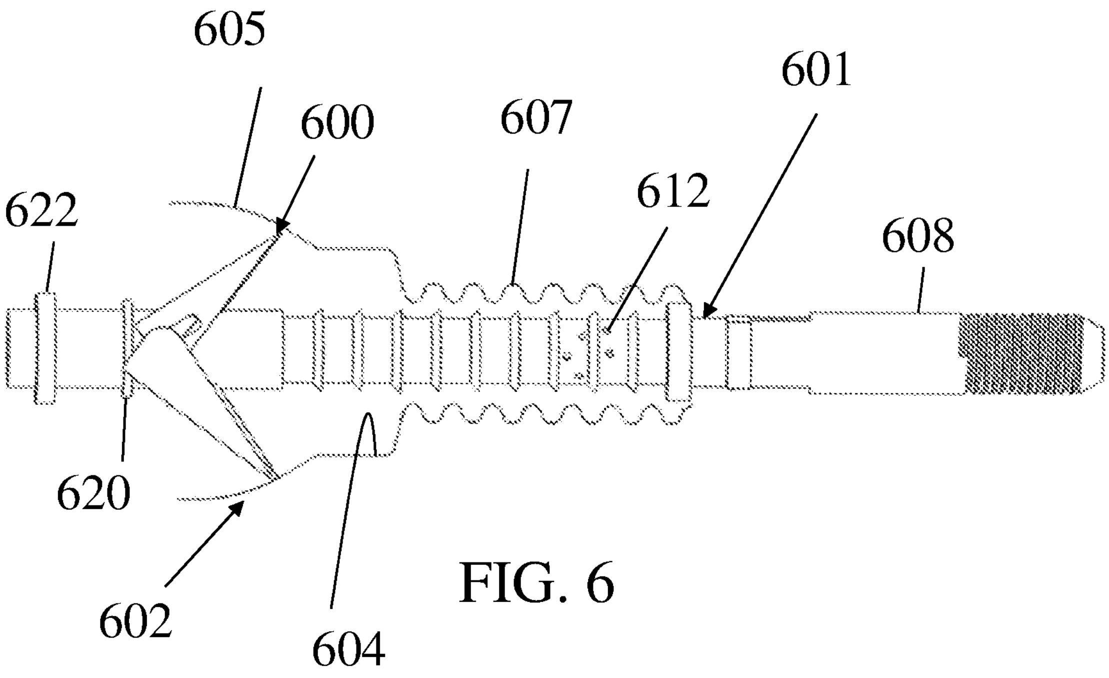
FIG. 6 is a cutaway, partial side view of another anchor engaged with an end fitting for use with a pressure element similar to the pressure elements of FIGS. 1-3 and 5 for use in the pressure vessel assembly of FIG. 1.

FIG. 6 is a cutaway, partial side view of another anchor 600 engaged with an end fitting 601 for use with a pressure element 602 similar to the pressure elements 102, 202, 302, 502 of FIGS. 1-3 and 5 for use in the pressure vessel assembly 100 of FIG. 1. The anchor 600 engages with the pressure element 602 at a cavity 604 of a wide portion 605 and a narrow portion 607 of the pressure element 602. The end fitting 601 includes a stem 608 that defines holes 612 similar to the holes 312 of FIG. 3. The end fitting 601 includes a first ridge 620 and a second ridge 622 positioned along the end of the stem 608 that is inserted into the pressure element 602. The first ridge 620 closest to the anchor 600 on the stem 608 is designed to be smaller, that is, to stand less proud from the stem 608, than the second ridge 622 that is spaced from the first ridge 620 as shown in FIG. 6.

As the end fitting 601 is pushed out of the cavity 604 due to excess pressure within the pressure element 602, the anchor 600 pushes against the cavity 604 of the wide portion 605 of the pressure element 602. The pushing of the anchor 600 causes a reaction force from the anchor 600 onto the first ridge 620. The first ridge 620 is designed to fail, that is, to allow the anchor 600 to slide along the stem 608, at a first pressure threshold. For example, the first pressure threshold can be 15,000 psi if the pressure element 602 is designed to store gas up to 3,600 psi or 25,000 psi if the pressure element 602 is designed to store gas up to 10,000 psi. The stem 608 then slides partially outside of the narrow portion 607 of the pressure element 602 without moving the anchor 600 so that the anchor 600 is now pushing against the second ridge 622. The second ridge 622 has a greater profile, overall size, and/or toughness than the first ridge 620 so that the second ridge 622 can withstand a greater force and will not fail until the pressure element 602 reaches a second, higher pressure threshold. For example, the second pressure threshold can be 20,000 psi if the pressure element 602 is designed to store gas up to 3,600 psi or 30,000 psi if the pressure element 602 is designed to store gas up to 10,000 psi. Once the stem 608 moves outward from cavity 604, the holes 612 become positioned outside of the cavity 604 and the narrow portion 607, so the holes 612 can vent pressurized gas. The consequence is that less pressure generates less force against the anchor 600 and the end fitting 601 to prohibit disengagement or ejection of the end fitting 601. The example pressure element 602 of FIG. 6 thus implements both the holes 612 and the anchor 600 to modify the failure mode and retain the end fitting 601.

In some embodiments, the anchor 600 and the holes 612 provide a dual system of venting pressurized gas. The second ridge 622 of the stem 608 provides a stop to prevent the anchor 600 from sliding off the stem 608. As described above, when the anchor 600 slides to the second ridge 622, the holes 612 are pushed outside of the cavity 604 past the narrow portion 607 so that pressurized gas is vented. As the second ridge 622 holds the anchor 600 in a fixed position, the anchor 600 may then puncture the cavity 604 with the arms 618 of the anchor 600 so that both the punctures created by the arms 618 and the holes 612 are simultaneously venting pressurized gas.

Figure 7:
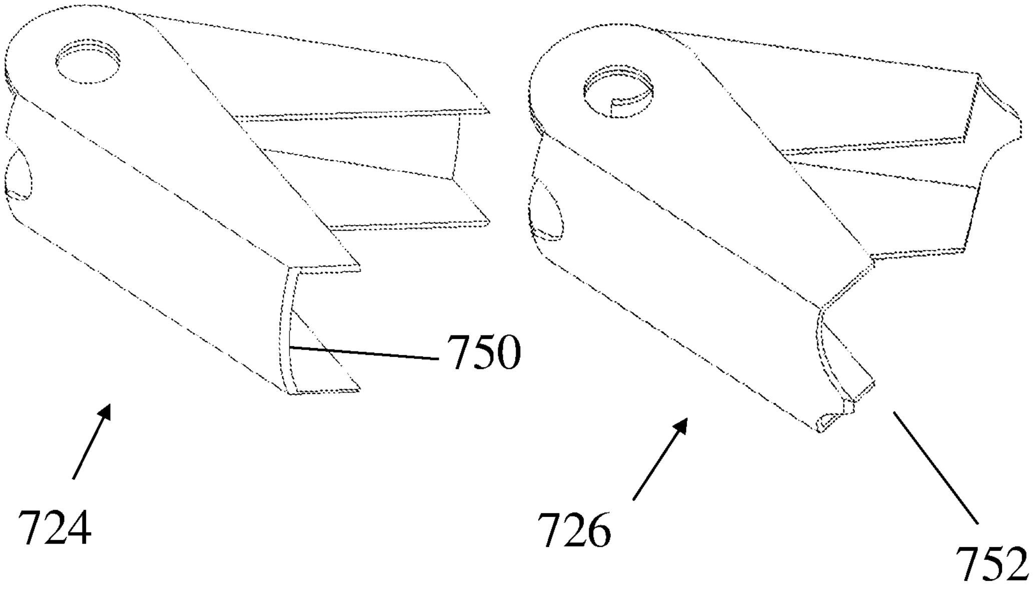
FIG. 7 is a perspective view of a blunt anchor and a sharp anchor for use in place of the anchors of FIGS. 5 and 6.

FIG. 7 is a perspective view of a blunt anchor 724 and a sharp anchor 726 for use in place of the anchors 500, 600 of FIGS. 5 and 6. The blunt anchor 724 has a rounded edge 750 that distributes stress on the cavity of the related pressure element. The rounded edge 750 of the blunt anchor 724 thus required a greater overall force to pierce the cavity to vent pressurized gas from the related pressure element than the sharp anchor 726. The sharp anchor 726 pierces the cavity with a pointed edge 752 so that pressure element can vent pressurized gas at a lower predetermined pressure threshold. The sharp anchor 726 pierces a wide portion and inside the cavity of the related pressure element with the pointed edge 752 well before the end fitting that couples to the sharp anchor 726 can disengage from the related pressure element. Use of the sharp anchor 726 over the blunt anchor 724 depends on the pressure threshold at which the designer of the end fitting and/or the pressure element wants a controlled leak to occur.

Figure 8:
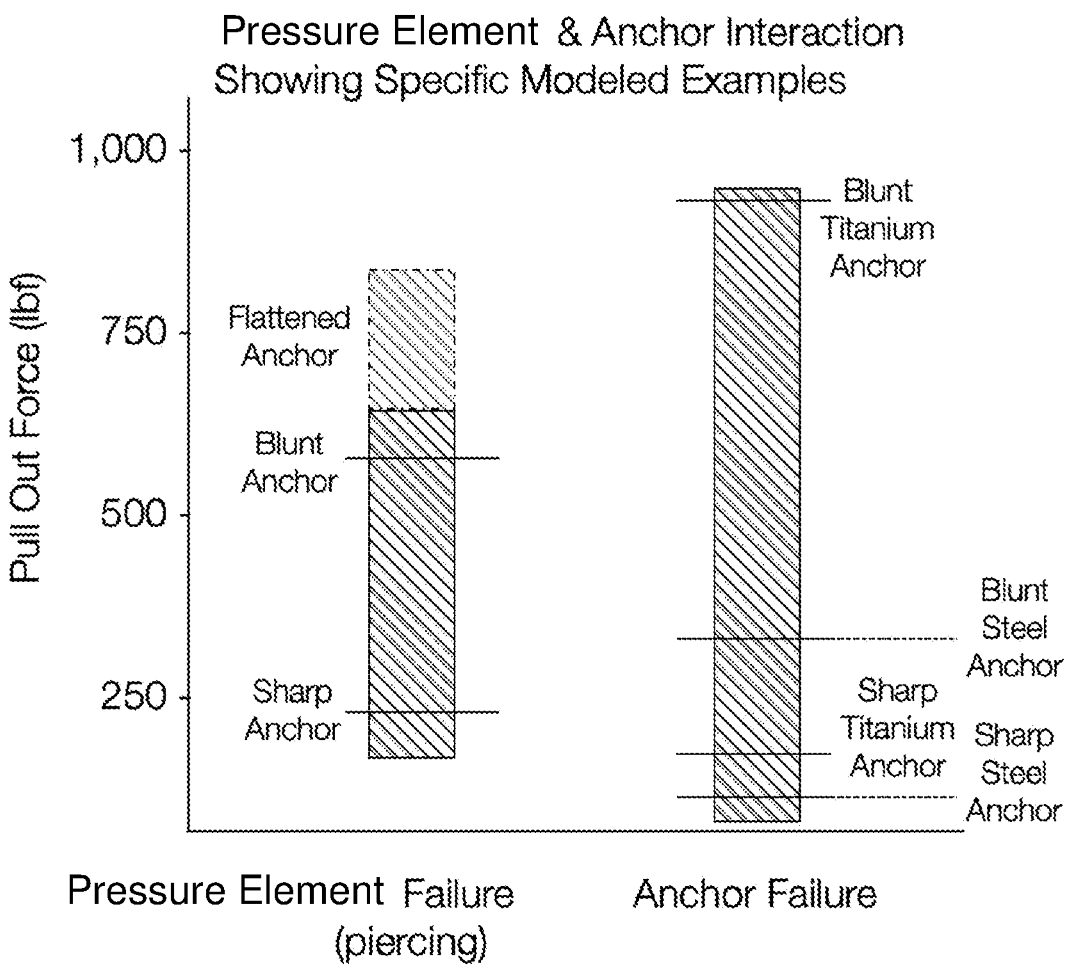
FIG. 8 is a chart of retention capabilities and failure modes for the anchors of FIGS. 4-7 in terms of ejection or pull-out force.

FIG. 8 is a chart of retention capabilities and failure modes for the anchors 400, 500, 600, 724, 726 of FIGS. 4-7 in terms of ejection or pull-out force. The chart shows the impact of different materials and designs for various anchors on the pressure threshold that dictates when partial or total ejection of the end fitting occurs based on pressure element failure vs. anchor failure. In other words, various design features of the anchors change the failure mode from ejection to piercing the pressure element. The blunt anchor 724 and the sharp anchor 726 of FIG. 7 are shown in the chart on the left side. The flattened anchor refers to a design with a larger, flat feature that distributes load, causing the stress on the pressure element to decrease. This material and design feature study shows that the anchor technique offers substantial assistance in end fitting retention when combined with another technique (such as holes in a stem of an end fitting) and is also effective in changing the failure mode from ejection to slower leak. The study also shows that the failure mode may be purposefully selected between the pressure element failure and anchor failure as desired, and these pressure threshold failure modes can be predicted based on the materials and design features chosen for the anchor.

Figure 9:
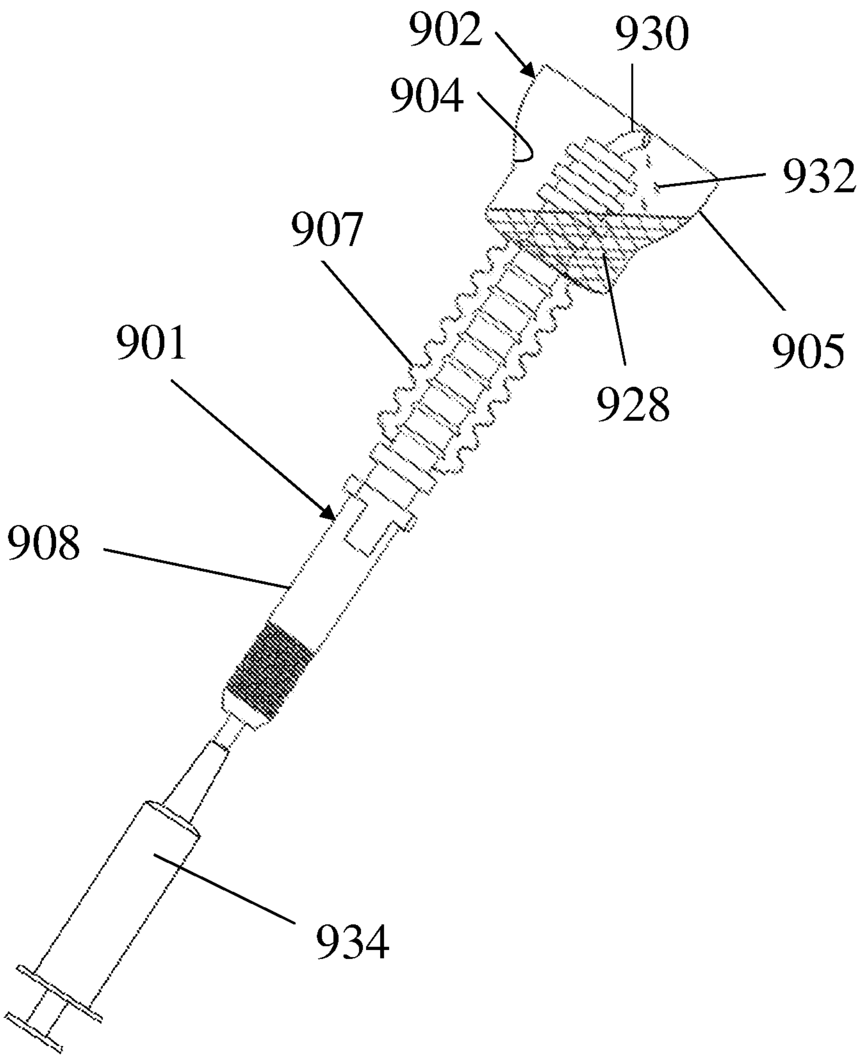
FIG. 9 is a partially transparent side view of an adhesive-based retention method for an end fitting similar to the end fittings of FIGS. 1-3 and 5-6 for use in a pressure element that can be stored in the pressure vessel assembly of FIG. 1.

FIG. 9 is a partially transparent side view of an adhesive-based retention method for an end fitting 901 similar to the end fittings 101, 201, 301, 501, 601 of FIGS. 1-3 and 5-6 for use in a pressure element 902 that can be stored in the pressure vessel assembly 100 of FIG. 1. The end fitting 901 is inserted into a cavity 904 to a wide portion 905 that is beyond the narrow portion 907 of the pressure element 902. In other words, a stem 908 of the end fitting 901 extends into the cavity 904. An adhesive plug 928 is deposited inside the cavity 904 at the wide portion 905 of the cavity 904 of the pressure element 902 at a location indicated by adhesive drops 932 being squeezed out of a tube 930 attached to a bottle 934 that supplies the adhesive. The adhesive drops 932 move through the tube 930 into the cavity 904 that surrounds the stem 908. The adhesive drops 932 move through the tube 930 positioned in a center or passageway of the stem 908. The pressure element 902 is positioned at an angle from vertical, that is, somewhat sideways, so when the adhesive drops 932 exit the tube 930, gravity pushes the adhesive drops 932 down into the cavity 904. While squeezing the bottle 934, the pressure element 902 is rotated so that the adhesive plug 928 fills the cavity 904 evenly around the stem 908. Once the adhesive plug 928 has been formed to an appropriate volume or level, the adhesive plug 928 is left to cool or harden and the tube 930 and the bottle 934 are removed from interface with the stem 908.

Figure 10:
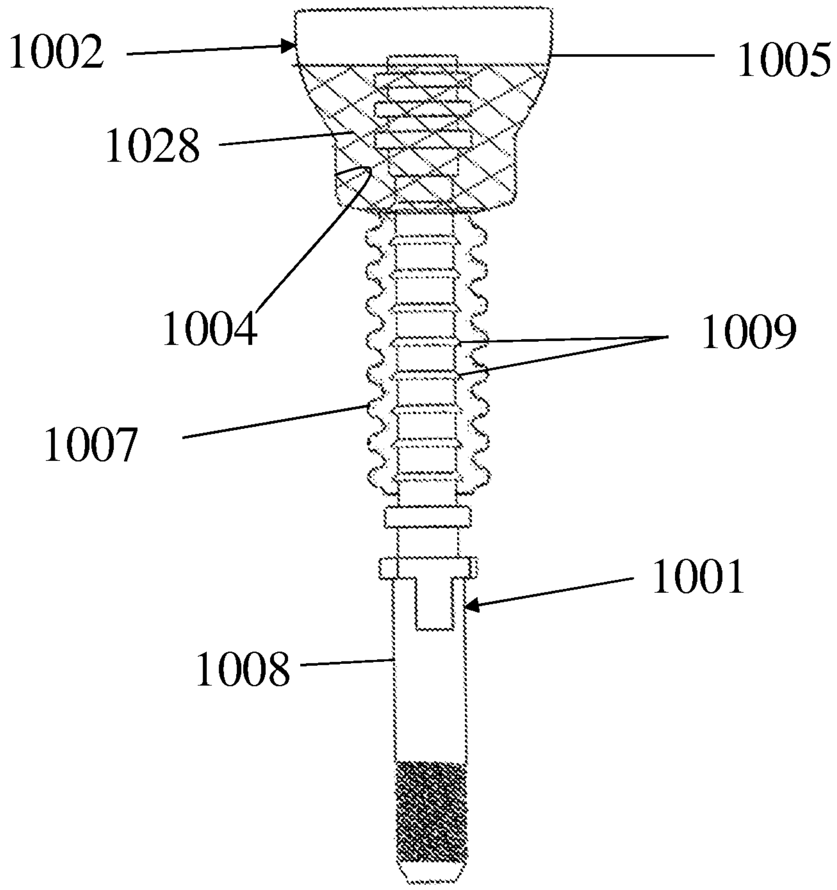
FIG. 10 is a partially transparent side view of an end fitting including an adhesive-based retention feature similar to that formed by the process described in FIG. 9.

FIG. 10 is a partially transparent side view of an end fitting 1001 including an adhesive-based retention feature similar to that formed by the process described in FIG. 9. The end fitting 1001 extends into a pressure element 1002 through a cavity 1004 of both a wide portion 1005 and a narrow portion 1007 of the pressure element 1002. A stem 1008 of the end fitting 1001 includes rings or barbs 1009 on an exterior surface that help create a form fit with the narrow portion 1007 of the pressure element 1002. The barbs 1009 help keep the stem 1008, and consequently the entire end fitting 1001, secured within the pressure element 1002 via use of an adhesive plug 1028. Once the adhesive supplied in the manner described in FIG. 9 is hardened or cooled, the adhesive turns into the adhesive plug 1028 having a solid form, and the adhesive plug 1028 locks the stem 1008 into a fixed position within the cavity 1004 of the pressure element 1002. The adhesive plug 1028 is sized so that it does not cover the hole extending axially through a center of the stem 1008, and gas still flows freely through the stem 1008.

In some embodiments, a sealer may be added on the end fitting 1001 at a bottom of the adhesive plug 1028 to stop any adhesive from leaking down between the stem 1008 and the pressure element 1002 before the adhesive has hardened. The adhesive plug 1028 may be formed from nylon, epoxy, glue, cement, or any other material that forms a seal between the pressure element 1002 and the stem 1008.

Figure 11:
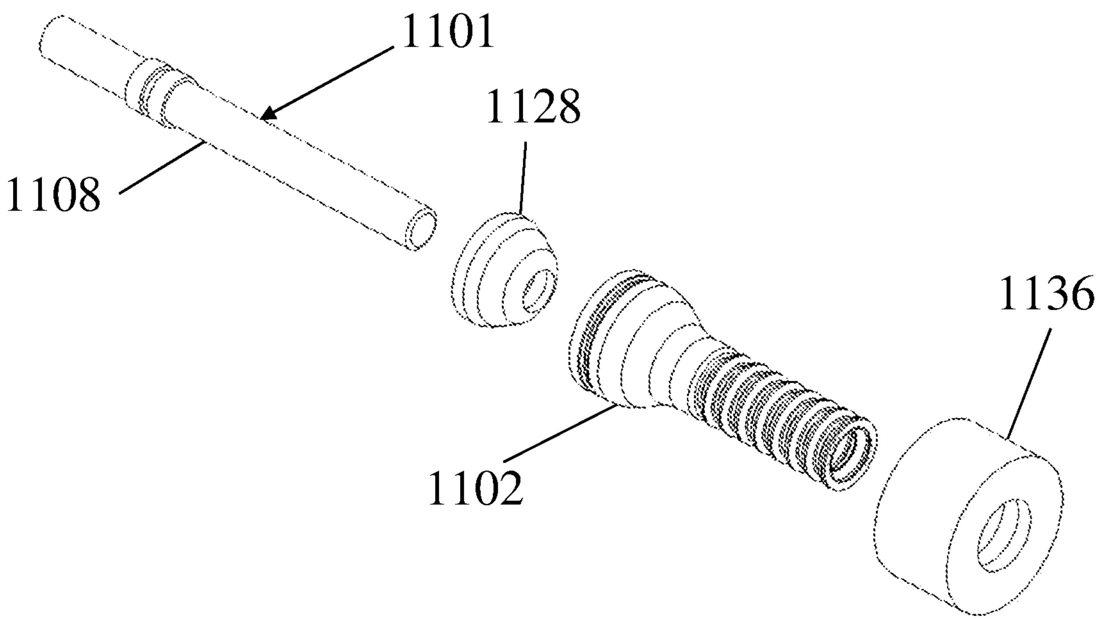
FIG. 11 is an exploded view of an end fitting including the adhesive-based retention features described in FIGS. 9-10 that is used to measure the strength of various adhesive-based retention features.

FIG. 11 is an exploded view of an end fitting 1101 including the adhesive-based retention features described in FIGS. 9-10 that is used to measure the strength of various adhesive-based retention features. The end fitting 1101 including a stem 1108 that is in a fixed position in an upper left of FIG. 11 with a pressure element 1102 and adhesive plug 1128 that extends between the pressure element 1102 and the stem 1108 being exploded along a common axis toward a lower right of FIG. 11. The stem 1108 has a sealed cap at a hole on the top of the stem 1108 to contain pressurized gas used in the strength measurement. The end fitting 1101 is attached with a steel stop 1136 that is meant to mimic a reaction force generated by a reinforcement fiber, such as the reinforcement fiber 203 of FIG. 2, used with the pressure elements 102 of the pressure vessel assembly 100.

Figure 12:
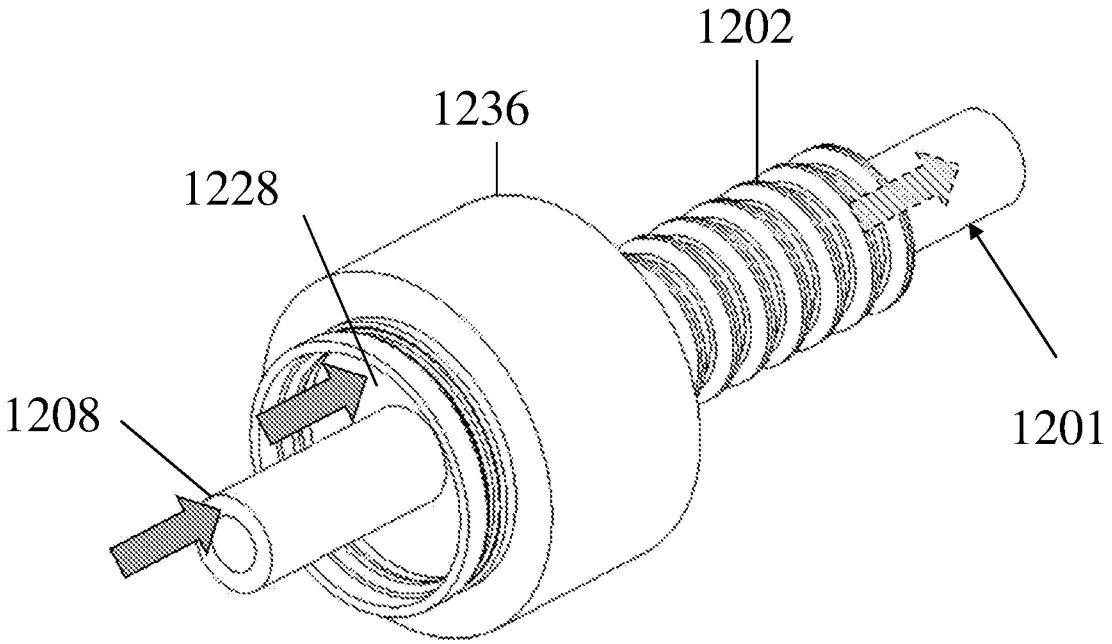
FIG. 12 is a perspective view showing a testing process to measure strength of an end fitting using the adhesive-based retention feature described in FIGS. 9-11.

FIG. 12 is a perspective view showing a testing process to measure strength of an end fitting 1201 using the adhesive-based retention feature described in FIGS. 9-11. The end fitting 1201 has a 210 MPa load placed onto the end fitting 1201 to correspond with a 30,000 psi failure pressure threshold achievable by a pressure element 1202. As the arrows show, the load is placed on an end of the pressure element 1202, a top of a stem 1208, a top of an adhesive plug 1228, and a top of steel stop 1236. This test process mimics forces experienced by the pressure element 1202, the end fitting 1201, and the adhesive plug 1228 should the pressure element 1202 be completely enclosed and contain 30,000 psi of compressed gas.

Figure 13:
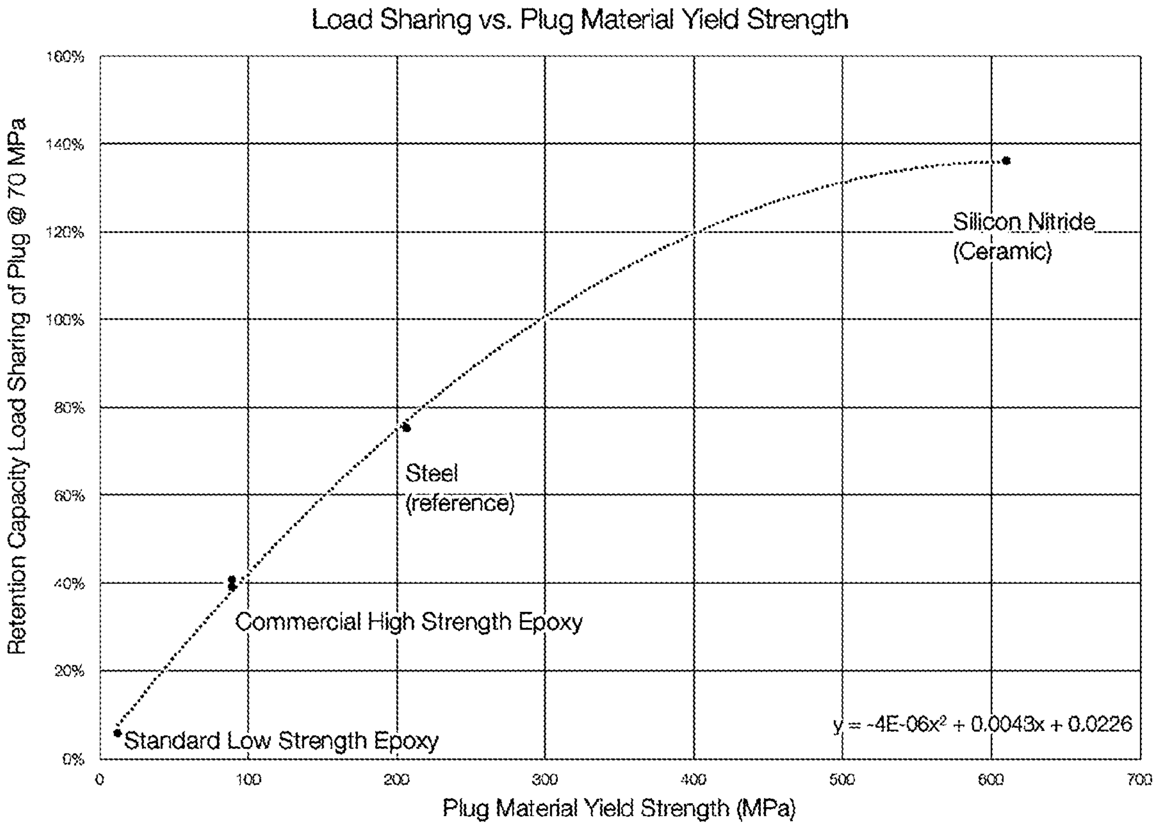
FIG. 13 is a graph showing retention capacity load sharing for different materials used in the adhesive-plug testing process described in FIGS. 11-12.

FIG. 13 is a graph showing retention capacity load sharing for different materials used in the adhesive-plug testing process described in FIGS. 11-12. The graph shows the capacity that each material has for load sharing or assisting the crimp to retain an end fitting such as the end fittings 901, 1001, 1101, 1201 of FIGS. 9-12. The plot point for steel is a reference that shows a lower retention capacity and yield strength than when Silicon Nitride is used. With a material such as Silicon Nitride, an adhesive plug such as the adhesive plugs 1028, 1128, 1228 is able to provide a minimum safety factor of 1.361 when subjected to a 210 MPa load (about 30,000 psi). Under normal working conditions, the load pressure is 70 MPa (about 10,000 psi).

The minimum safety factor is a valuable indicator of successful improvement in end fitting retention since the target pressure, for example, a pressure of 30,000 psi, for the pressure element takes into account a degree of additional stress pressure as compared to a normal working pressure, for example, a pressure of 10,000 psi, for the relevant pressure element. Therefore, the Silicon Nitride exhibits good structural integrity at conditions that include significantly higher pressures than average conditions experienced by pressure vessel assemblies, like the pressure vessel assemblies 100 of FIG. 1. Other adhesives, such as high or low strength epoxy, did not demonstrate as high a retention capacity or plug material yield strength.

As shown in FIG. 13, yield strengths for the high strength and low strength epoxy were about 90 MPa for the high strength epoxy with 40% retention capacity and about 10 MPa for the low strength epoxy at less than 10% retention capacity. The graph of FIG. 13 thus shows that the use of an adhesive plug, particularly one formed from Silicon Nitride, provides improved end-fitting retention capacity that could be used to supplement, replace, or provide a more secure alternative to a standard crimped-shell design for end fitting retention. The graph also shows a distinction between end fitting retention and gas sealing aspects of a given retention design. That is, the adhesive plug can be used to provide retention of an end fitting while the crimped cap around the stem of the end fitting can be used to provide sealing for a pressure element.

Figure 14:
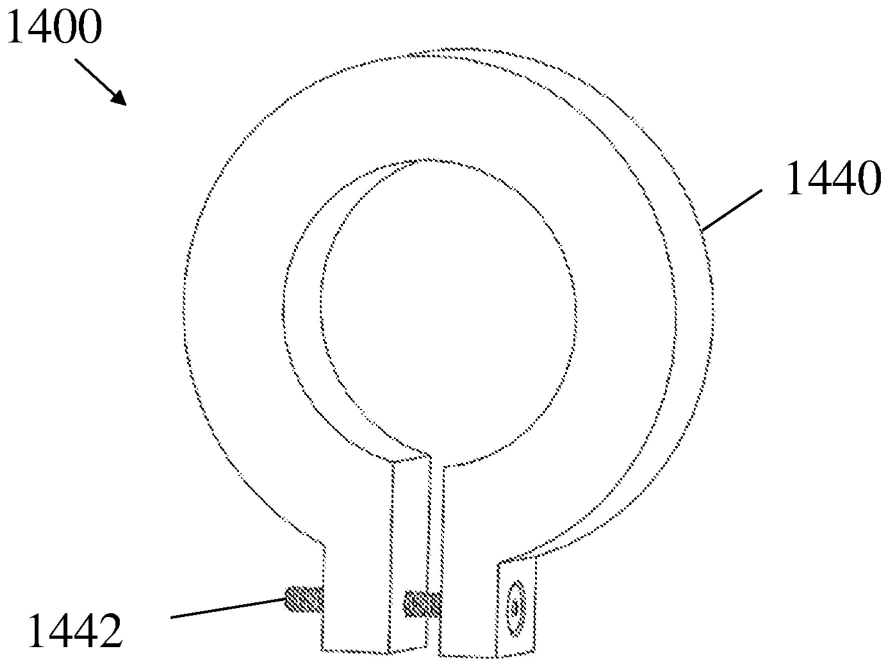
FIG. 14 is a perspective view of a bulkhead for use with the pressure vessel assembly of FIG. 1.

FIG. 14 is a perspective view of a bulkhead 1400 for use with the pressure vessel assembly 100 of FIG. 1. The bulkhead 1400 includes a collar 1440 that can be tightened or loosened by adjusting a screw 1442 holding ends of the collar 1440 together. The screw 1442 can be tightened or loosened to adjust a size of an opening in the collar 1440. The bulkhead 1400 is shown as including a single screw 1442, but a bulkhead 1400 may include one or more screws, two or more screws, three or more screws, or a plurality of screws so that the collar may be loosened or tightened appropriately.

Figure 15:
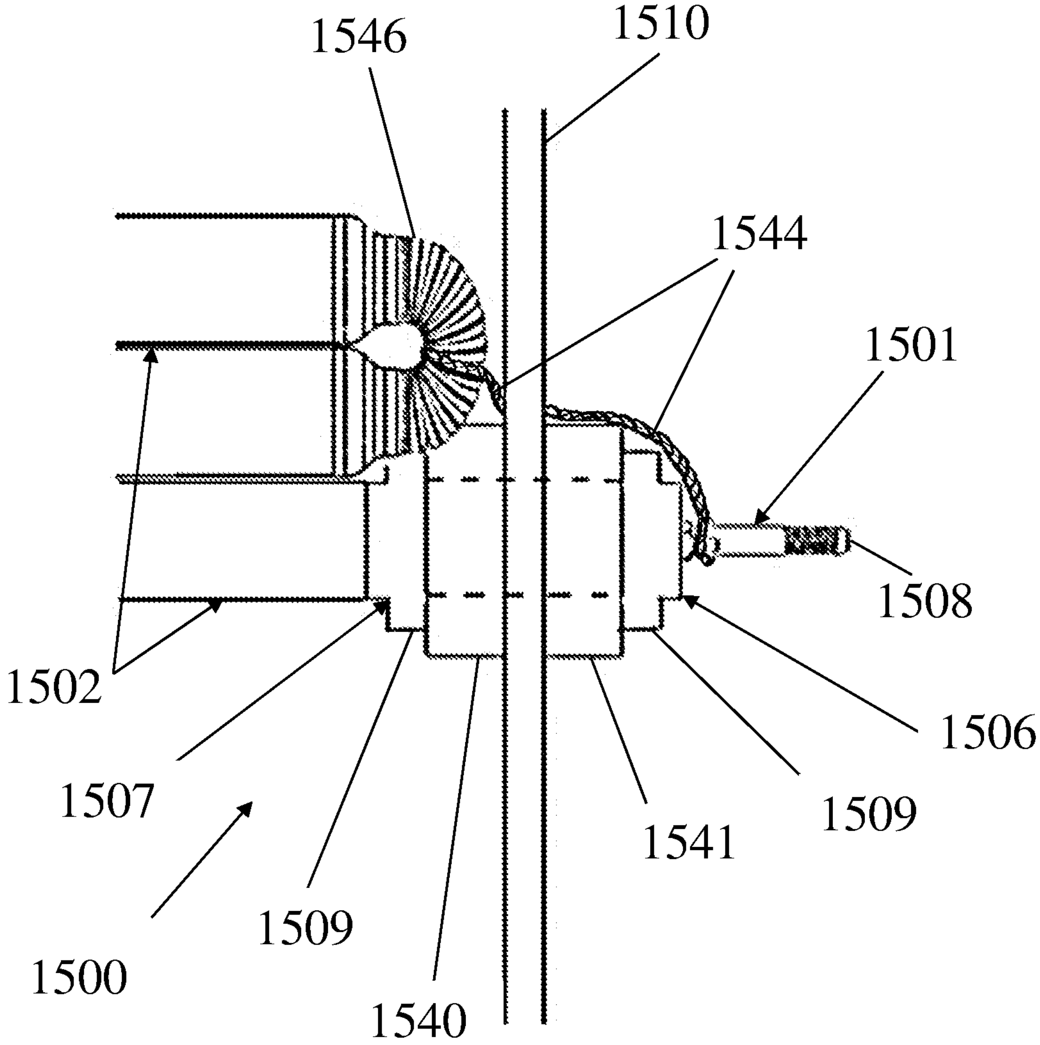
FIG. 15 is a cutaway, partial side view of a bulkhead assembly for use with the pressure vessel assembly of FIG. 1.

FIG. 15 is a cutaway, partial side view of a bulkhead assembly 1500 for use with the pressure vessel assembly 100 of FIG. 1. The bulkhead assembly 1500 surrounds an end fitting 1501 and a pressure element 1502. The end fitting 1501 includes caps 1506, 1507 that both include platforms 1509. The end fitting 1501 and the pressure element 1502 connect through and are surrounded by a shell 1510 that splits the caps 1506, 1507 so that the end fitting includes a cap 1506 that is external and a cap 1507 that is internal. The caps 1506, 1507 may contact each other, or the caps 1506, 1507 may be separated by a space. The bulkhead assembly 1500 includes a collar 1540 that is internal and a collar 1541 that is external. The collars 1540, 1541 grip to and are held in place by the platforms 1509 of the caps 1506, 1507. The collars 1540, 1541 are separated at a vertical axis by the shell 1510. Both collars 1540, 1541 surround the end fitting 1501 and the pressure element 1502. The collar 1540 that is internal connects with the cap 1507 that is internal and presses against an inside of the shell 1510. The collar 1541 that is external connects with the cap 1506 that is external and presses against an outside of the shell 1510. The two collars 1540, 1541 are tightened and forced together, which in turn applies pressure to the shell 1510, the pressure element 1502, and the end fitting 1501 in between the collars 1540, 1541. As the pressure element 1502 is pressurized and force is applied outward on the end fitting 1501, the bulkhead assembly 1500 more evenly distributes this stress and holds the cap 1506 that is external in place, which in turn holds the stem 1508 in place.

The bulkhead assembly 1500 may include a tether 1544 for retaining the end fitting 1501. The tether 1544 may connect the end fitting 1501 and the shell 1510 or the end fitting 1501 and the pressure element 1502 inside of the shell 1510. In the FIG. 15 example, the tether 1544 is wrapped around and tied to the stem 1508, pushed through the hole in the shell 1510 along the collar 1541, and tied to a curved portion 1546 of the pressure element 1502 within an interior of the shell 1510. This technique using the tether 1544 increases the likelihood of the end fitting 1501 being retained regardless of the failure mode and can be used in combination with other retention techniques to provide redundancy.

Figure 16:
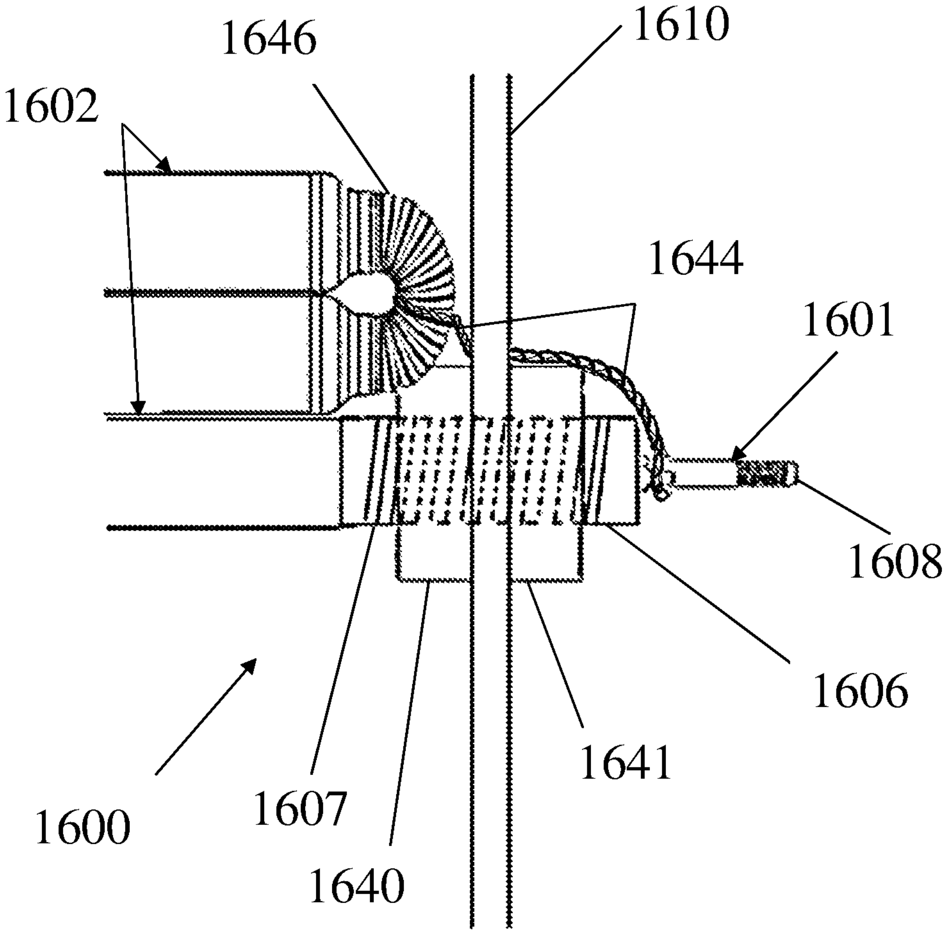
FIG. 16 is a cutaway, partial side view of another bulkhead assembly for use with the pressure vessel assembly of FIG. 1.

FIG. 16 is a cutaway, partial side view of another bulkhead assembly 1600 for use with the pressure vessel assembly 100 of FIG. 1. The bulkhead assembly 1600 connects an end fitting 1601 and a pressure element 1602. The end fitting 1601 includes caps 1606, 1607. The caps 1606, 1607 may contact each other or may be separated by a space. The end fitting 1601 includes a stem 1608 that is inserted through a shell 1610 to connect with the pressure element 1602. A collar 1640 that is internal is screwed onto the cap 1607 that is internal, and a collar 1641 that is external is screwed onto the cap 1606 that is external. The collars 1640, 1641 are separated by a vertical axis of the shell 1610. The collars 1640, 1641 screw together so that the collars 1640, 1641 can squeeze around the shell 1610 and apply a pressure to the end fitting 1601, the pressure element 1602, and the shell 1610. The bulkhead assembly 1600 may include a tether 1644 for retaining the end fitting 1601. The tether 1644 may connect the end fitting 1601 and the shell 1610 or the end fitting 1601 and the pressure element 1602 inside of the shell 1610. In the FIG. 16 example, the tether 1644 is wrapped around and tied to the stem 1608, pushed through the hole in the shell 1610 along the collar 1641, and tied to a curved portion 1646 of the pressure element 1602 within an interior of the shell 1610. This technique using the tether 1644 increases the likelihood of the end fitting 1601 being retained regardless of the failure mode and can be used in combination with other retention techniques to provide redundancy.

In some embodiments, the caps 1606, 1607 and the collars 1640, 1641 may be tightened down with a wrench or any other means capable of tightening a threaded cylinder. The shell 1610 may be reinforced to increase the pressure threshold capable before disengagement of the end fitting 1601 from the pressure element 1602. The collars 1540, 1541, 1640, 1641, that are squeezed together may include nuts, adjustable rings, bolts, or any combination of tightening on tensioning mechanisms. The collars 1640, 1641 may be threaded to match the caps 1606, 1607.

Figure 17:
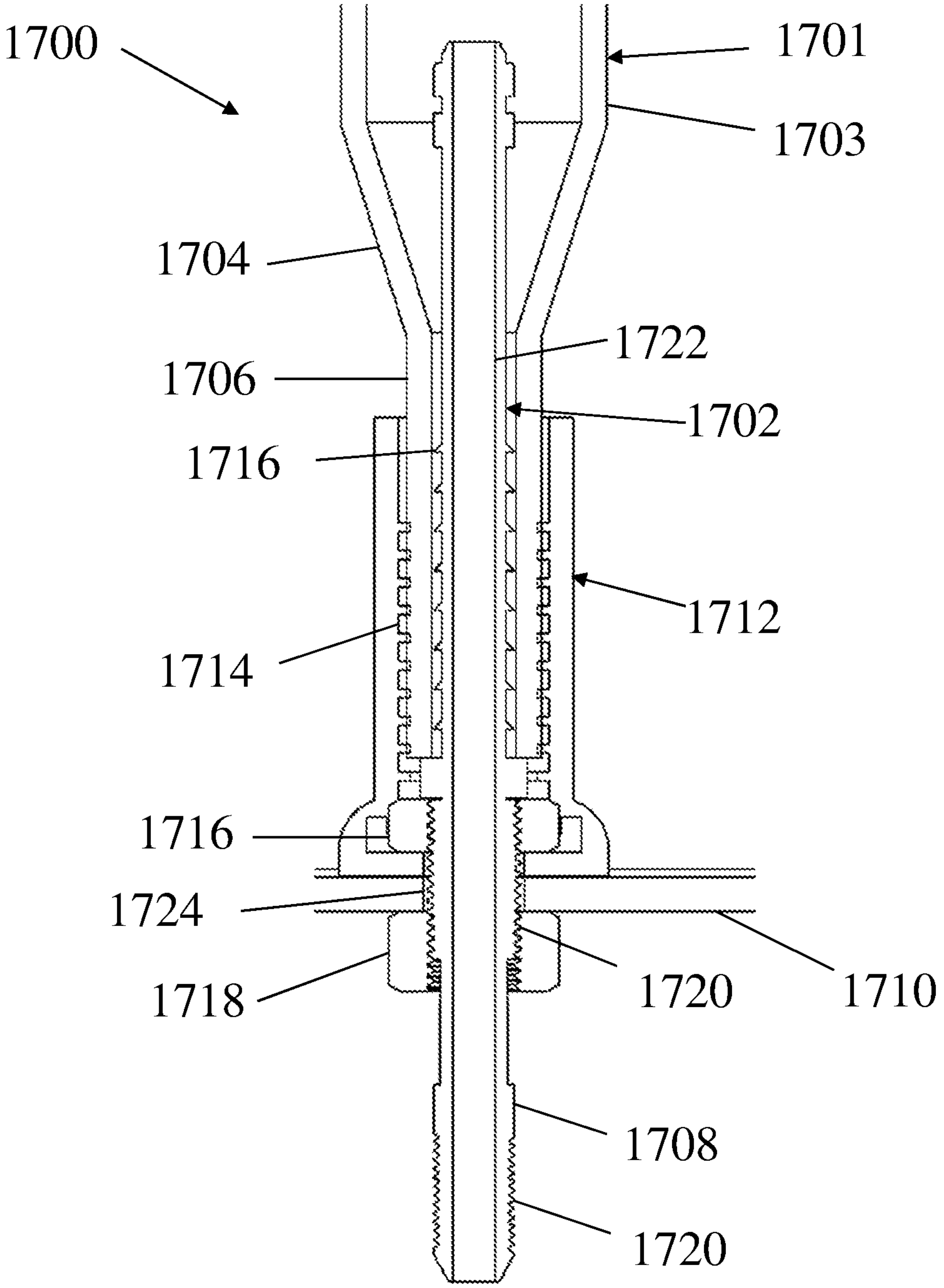
FIG. 17 is a cutaway, side view of another bulkhead assembly for use with the pressure vessel assembly of FIG. 1.

FIG. 17 is a cutaway, side view of another bulkhead assembly 1700 for use with the pressure vessel assembly 100 of FIG. 1. The bulkhead assembly 1700 may be similar to the bulkhead assemblies 1500, 1600 of FIGS. 15-16. The bulkhead assembly 1700 includes a pressure element 1701, which may be comprised of a gas containing liner and a reinforcement layer, attached to an end fitting 1702 so that the pressure element 1701 has a bendable and/or extendable connection between other pressure elements (not shown) and outside components. The pressure element 1701 has a wide portion 1703 that is connectable to a transition portion 1704 and has a narrow portion 1706 that is interface-able with a stem 1708 that is connectable to a gas source (not shown). As the stem 1708 extends from outside of a shell 1710 and extends well into the pressure element 1701 and/or the wide portion 1703 of the pressure element 1701, a cap 1712 is used to surround and/or squeeze together the stem 1708 and the narrow portion 1706 so that the stem 1708 is radially and fluidly secured by the cap 1712. To keep the stem 1708 axially secure inside of the pressure element 1701, corrugations 1714 on an internal surface of the cap 1712 are interface-able or locked with barbs 1716 on an external surface of the stem 1708. The corrugations 1714 and the barbs 1716 are useful to prevent pushing or pulling of the stem 1708 in an axial direction, when the cap 1712 is squeezed and/or secured over the stem 1708.

Since the cap 1712 is positioned on the inside of the of shell 1710 relative to outside of the bulkhead assembly 1700, collars 1716, 1718 are used to provide a mechanism for preventing both axial and radial motion of the stem 1708, pressure element 1701, and cap 1712 relative to the shell 1710. The collars 1716, 1718 and the stem 1708 have threaded portions 1720 that can be screwably secured when the stem 1708 is inserted into the narrow portion 1706 of the pressure element 1701. The stem 1708 is shown as having multiple threaded portions 1720, spaced apart axially along the stem 1708, that are sized to account for various thicknesses of the shell 1710, use of the collars 1716, 1718, and interface with the gas source (not shown). The shell 1710 may further include threaded portions (not shown) for an additional feature to secure the stem 1708.

Before the bulkhead assembly 1700 is fully assembled, the cap 1712 is squeezed and/or secured around the narrow portion 1706 and the stem 1708, and the collars 1716, 1718 are threaded with the stem 1708 so that the cap 1712 is properly positioned for the crimping operation. Gases are flow-able between the pressure element 1701 and an outside environment through a channel 1722 of the stem 1708. In this configuration, the gases should not be flowing or leaking at a space between the external surface of the stem 1708 and the internal surface of the narrow portion 1706. Further, as the collars 1716, 1718 and the cap 1712 are wrapped or squeezed around an opening 1724 of the shell 1710, gases are prevented from flowing and/or leaking out the shell 1710 at the opening 1724.

All of the retention techniques described herein allow for improvement in predictability of failure mode to be calculated based on pressure and corresponding tensile force experienced by compressed-gas pressure elements either independently or for use in pressure vessel assemblies. These retention techniques also help to lower fatigue and therefore extend the life expectancy of compressed-gas pressure elements.

What is claimed is:

1. A pressure vessel assembly, comprising:

a pressure element configured to store compressed gas;

a shell configured to enclose the pressure element and capture the compressed gas that permeates from the pressure element;

an end fitting extending into a cavity of the pressure element and from the pressure element through the shell, the end fitting comprising:

a stem that extends out from the shell in one direction and into the cavity of the pressure element in an opposite direction and comprises holes extending through a surface of the stem, configured to vent the compressed gas as the stem moves out of the cavity, and configured to reduce pressure on the end fitting; and a cap that surrounds the pressure element and the stem at a location external to the pressure element; and a retention component configured to sustain engagement of the end fitting with at least one of the pressure element or the shell below a predetermined pressure threshold.

2. The pressure vessel assembly of claim 1, wherein the stem comprises:

one or more barbs that lock the stem in a fixed position in relation to the pressure element.

3. The pressure vessel assembly of claim 1, wherein the retention component is an anchor positioned proximate to an end of the stem and positioned at a location within the cavity of the pressure element, the anchor comprising:

one or more arms configured to prevent removal of the stem from the cavity of the pressure element below the predetermined pressure threshold.

4. The pressure vessel assembly of claim 3, wherein the one or more arms of the anchor include an edge that is flat, blunt, sharp, or any combination thereof, and wherein the edge is configured to puncture the pressure element above the predetermined pressure threshold.

5. The pressure vessel assembly of claim 4, wherein the holes are configured to vent the compressed gas to a pressure level below the predetermined pressure threshold as the stem moves out of the cavity and before the edge of the one or more arms punctures the pressure element.

6. The pressure vessel assembly of claim 3, the stem further comprising:

a first ridge positioned between the end of the stem and the anchor, the first ridge configured to fail and allow movement of the anchor as the anchor contacts the first ridge; and a second ridge spaced from the first ridge, the second ridge being closer to the end of the stem than the first ridge, the second ridge configured to stop movement of the anchor as the anchor contacts the second ridge.

7. The pressure vessel assembly of claim 1, wherein the retention component is an adhesive plug, and wherein the adhesive plug and the stem are directly coupled at a fixed position within the cavity of the pressure element and configured to prevent end fitting disengagement below the predetermined pressure threshold.

8. The pressure vessel assembly of claim 1, wherein the cap is a first cap and wherein the retention component comprises:

a bulkhead assembly, comprising:

a second cap surrounding the pressure element and the stem at a location internal to and abutting an interior surface of the shell;

a third cap surrounding the stem at a location external to and abutting an exterior surface of the shell;

a first collar coupling to the second cap, the first collar configured to distribute pressure applied to the second cap to the shell;

a second collar coupling to the third cap, the second collar configured to clamp the shell between the second collar and the first collar; and one or more screws tightening or loosening the first and second collars in respect to the shell or in respect to the second or third caps.

9. The pressure vessel assembly of claim 1, wherein the retention component comprises:

a tether with a first end coupled to the stem at a location external to the shell and a second end coupled to a curved portion of another pressure element interior to the shell.

10. A pressure vessel assembly, comprising:

a pressure element defining a cavity with a wide portion and a narrow portion, the pressure element configured to store compressed gas; and an end fitting extending into the cavity of the pressure element, the end fitting comprising:

a stem extending through the narrow portion and the wide portion and comprises holes extending through a surface of the stem, configured to vent the compressed gas as the stem moves out of the cavity, and configured to reduce pressure on the end fitting; and a cap surrounding the narrow portion of the pressure element and the stem at a location external to the pressure element, a retention component configured to sustain engagement of the end fitting with at least one of the pressure element below a predetermined pressure threshold.

11. The pressure vessel assembly of claim 10, wherein the stem comprises:

one or more barbs that lock the stem in a fixed position in relation to the pressure element.

12. The pressure vessel assembly of claim 11, wherein the narrow portion includes corrugations that are configured to align with the one or more barbs, and wherein the cap is crimp-able around the narrow portion so that the cap conforms to the corrugations, the one or more barbs, or both.

13. The pressure vessel assembly of claim 12, wherein the cap includes indents positioned to align with the corrugations and the one or more barbs, and wherein the cap is crimp-able around the narrow portion and the stem so that a tight fit is formed between the corrugations, the one or more barbs, and the indents.

14. The pressure vessel assembly of claim 12, wherein when the cap is crimped around the stem and the narrow portion at the corrugations, the cap stretches axially so that a tight fit is formed between the pressure element and the stem.

15. A pressure vessel assembly, comprising:

pressure elements configured to store compressed gas;

a shell enclosing the pressure elements, the shell configured to capture the compressed gas that permeates from the pressure elements; and an end fitting extending through the shell and into a cavity of the pressure elements, the end fitting comprising:

a stem having a first end and a second end and comprising holes extending through a surface of the stem, configured to vent the compressed gas as the stem moves out of the cavity, and configured to reduce pressure on the end fitting, the first end extending into the cavity of the pressure elements, the second end extending out through the shell, and the stem having a hollow portion so that the compressed gas is passable through the stem; and a tube fixed to the first end of the stem and configured to distribute adhesive that is supplied through the hollow portion of the stem, the distributed adhesive configured as a retention component to retain the end fitting within the pressure elements.

16. The pressure vessel assembly of claim 15, further comprising:

an adhesive plug formed by the distributed adhesive, positioned between the stem and the pressure elements, and configured to retain the end fitting within the pressure elements.

17. The pressure vessel assembly of claim 16, wherein the stem comprises:

barbs locking the stem in a fixed axial position in relation to the pressure elements so that the adhesive plug forms below a distal end of the tube.

18. The pressure vessel assembly of claim 17, wherein the cavity of the pressure elements includes a narrow portion and a wide portion, the wide portion configured to house the tube and the adhesive plug, the narrow portion including corrugations aligned along the barbs of the stem, the corrugations configured to interface with the barbs of the stem so that the stem is held in a fixed axial position.

19. The pressure vessel assembly of claim 18, further comprising:

a cap crimp-able around the narrow portion of the pressure elements so that the second end of the stem is secured by the cap, the cap and the adhesive plug preventing the end fitting from moving radially relative to the pressure elements.

20. The pressure vessel assembly of claim 10, wherein the retention component comprises:

a tether with a first end coupled to the stem at a location external to a shell that encloses the pressure element and a second end coupled to a curved portion of another pressure element interior to the shell.

* * * * *